United States Patent [19]

Allen et al.

[11] 4,109,720

[45] Aug. 29, 1978

[54] COMBINATION SOLVENT-NONCONDENSIBLE GAS INJECTION METHOD FOR RECOVERING PETROLEUM FROM VISCOUS PETROLEUM-CONTAINING FORMATIONS INCLUDING TAR SAND DEPOSITS

[75] Inventors: Joseph C. Allen, Bellaire, Tex.; David A. Redford, Fort Saskatchewan, Canada

[73] Assignees: Texaco Inc., New York, N.Y.; Texaco Exploration Canada, Ltd., Calgary, Canada

[21] Appl. No.: 740,281

[22] Filed: Nov. 9, 1976

Related U.S. Application Data

[63] Continuation-in-part of Ser. No. 406,409, Oct. 15, 1973, abandoned.

[51] Int. Cl.$^2$ .................... E21B 43/22; E21B 43/24
[52] U.S. Cl. .................... 166/269; 166/272; 166/274
[58] Field of Search ............ 166/252, 272, 273, 274, 166/304, 269

[56] References Cited

U.S. PATENT DOCUMENTS

| | | | |
|---|---|---|---|
| 2,867,277 | 1/1959 | Weinaug et al. | 166/273 |
| 2,897,894 | 8/1959 | Draper et al. | 166/272 |
| 3,003,554 | 10/1961 | Craig, Jr. et al. | 166/252 X |
| 3,157,230 | 11/1964 | Connally, Jr. et al. | 166/274 |
| 3,179,166 | 4/1965 | Sharp | 166/252 X |
| 3,231,018 | 1/1966 | Handy | 166/252 |
| 3,269,460 | 8/1966 | Hardy et al. | 166/274 |
| 3,334,688 | 8/1967 | Blackwell et al. | 166/273 |
| 3,759,325 | 9/1973 | Gogarty | 166/273 |
| 3,838,737 | 10/1974 | Allen et al. | 166/274 |
| 3,845,821 | 11/1974 | Allen et al. | 166/274 X |
| 3,856,086 | 12/1974 | Braden, Jr. | 166/273 X |
| 3,878,892 | 4/1975 | Allen et al. | 166/274 X |
| 3,908,762 | 9/1975 | Redford | 166/272 X |
| 3,913,672 | 10/1975 | Allen et al. | 166/274 X |

FOREIGN PATENT DOCUMENTS

| | | | |
|---|---|---|---|
| 738,784 | 7/1966 | Canada | 166/273 |
| 726,712 | 3/1955 | United Kingdom | 166/274 |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Petroleum may be recovered from viscous petroleum-containing formations including tar sand deposits by injecting into the formation a solvent which is liquid at formation conditions and simultaneously therewith injecting a substance which will remain totally gaseous at the pressure and temperature conditions existing within the reservoir. The presence of noncondensible gas in the formation into which solvent is being injected prevents formation of a impermeable bitumen bank which blocks the further flow of fluids through the formation. The gas should be essentially unreactive with the solvent and formation fluids in order to obtain the desired benefits. Examples of suitable gases for the practice of this invention include methane, ethane, nitrogen, carbon dioxide, and mixtures thereof.

39 Claims, No Drawings

COMBINATION SOLVENT-NONCONDENSIBLE GAS INJECTION METHOD FOR RECOVERING PETROLEUM FROM VISCOUS PETROLEUM-CONTAINING FORMATIONS INCLUDING TAR SAND DEPOSITS

CROSS REFERENCE TO RELATED APPLICATION

This is a continuation-in-part of copending application Ser. No. 406,409 filed Oct. 15, 1973, now abandoned.

BACKGROUND OF THE INVENTION

1. Field of the Invention

This invention is concerned with a method for recovery of petroleum from viscous petroleum-containing formations including tar sand deposits, and more particularly is concerned with an improved combined miscible flooding noncondensible gas injection technique especially useful in viscous petroleum-containing fromations including tar sand deposits.

2. Description of the Prior Art

There are many subterranean petroleum-containing formations in various parts of the world from which petroleum cannot be recovered by conventional means because the petroleum is too viscous to flow or be pumped. The most extreme example of viscous petroleum-containing formations are the so-called tar sand or bituminous sand deposits. The largest and most famous such deposit is the Athabasca Tar Sand Deposit in the northeastern part of the Province of Alberta, Canada, which is estimated to contain over 700 billion barrels of petroleum. Other extensive deposits are known to exist in the western United States and Venezuela, and smaller deposits exist in Europe and Asia.

Tar sands are defined as sand saturated with a highly viscous crude petroleum material not recoverable in its natural state through a well by ordinary production methods. The petroleum constituent of tar sand deposits are highly bituminous in character. The sand content of tar sand deposits are generally fine quartz sand coated with a layer of water, with the bituminous petroleum material occupying most of the void space around the water wetted sand grains. The balance of the void space is filled with connate water, and some deposits contain small volumes of gas such as air or methane. The sand grains are packed to avoid volume of about 35 percent, which corresponds to 83 percent by weight sand. The balance of the material is bitumen and water, and the sum of bitumen and water is fairly constantly 17 percent by weight, with the bitumen portion thereof varying from about 2 percent to about 16 percent. One of the characteristics of tar sand deposits which differs considerably from conventional petroleum-containing formations is the absence of a consolidated mineral matrix within the formation. The sand grains are in contact although uncemented and the bitumen occupies most of the void space. The API gravity of the bitumen ranges from about 6 to about 8, and the specific gravity at 60° F. is from about 1.006 to about 1.027.

The methods for recovering bituminous petroleum from tar sand deposits include strip mining and in situ processes. Most of the recovery to date has been by means of strip mining, although this is economically feasible only when the ratio of overburden thickness to tar sand deposit thickness is around 1 or less. Vast quantities of petroleum are known to exist in the form of tar sand deposits which are not within a range which is economically suitable for strip mining, and so some form of in situ processes wherein the bitumen or bituminous petroleum is separated from the sand by some means and recovered therefrom by a well or other production means drilled into the tar sand deposit is needed.

In situ processes may be categorized as thermal techniques, including fire flooding and steam flooding, and emulsification drive processes. Emulsification processes frequently also employ steam, plus a basic material such as sodium hydroxide which induces formation of an oil-in-water emulsion having a viscosity substantially lower than the viscosity of the formation petroleum. Thermal processes are suitable for use only in formations having sufficient overburden thickness to permit injection of high pressure fluids. Many tar sand deposits exist in which the overburden thickness is too thin for thermal flooding and too thick for strip mining.

One process for recovering bitumen from tar sand deposits which does not require the presence of sufficient overburden thickness to contain high pressures is solvent flooding. Solvent flooding involves injection of a solvent into the tar sand deposit, which solvent dilutes and reduces the viscosity of the bituminous petroleum to render it mobile and recoverable by means of a well as is normally employed in conventional oil recovery operations. Although laboratory experiments can amply demonstrate that many solvents including aromatic hydrocarbons such as benzene and toluene, as well as carbon tetrachloride or carbon disulfide, can readily dissolve bituminous petroleum, there are yet problems in some formations which must be solved if commercial exploitation of tar sand deposits by solvent flooding is to be feasible.

The most desirable type of oil recovery operation, including a solvent injection oil recovery process, is the multi-well throughput operation in which a fluid is injected continuously into one or more injection wells and a mixture of the fluid and the petroleum is recovered continously from one or more spaced apart production wells. When solvent is injected into an injection well and begins to move away from the point of entering the petroleum formation adjacent to the injection well, bitumen is dissolved in the solvent; the fluid moving through the formation is the solvent-bitumen solution. The amount of bitumen dissolved in the solvent increases with contact time, and so the solvent-bitumen solution moving through the formation in a general direction of the production well dissolves increasing amounts of bitumen. Since bitumen is an extremely viscous material, it frequently occurs that a solution containing the maximum concentration of bitumen which will dissolve in a given solvent becomes too viscous to flow in the formation. This phenomenon gives rise to the formation of a bitumen bank, or a bank of bitumen and solvent moving like a wave through the formation, but with its viscosity increasing continually as it moves away from the injection point. Eventually, the bitumen-solvent blend viscosity increases to a point where it will no longer move under the available pressure gradient, after which further injection of the solvent into the formation becomes impossible. Although it would be possible to reduce the viscosity of the bitumen bank by contacting it with additional solvent, the sovlent cannot reach bitumen where it is needed most. The receptivity of the formation to solvent decreases dramatically because of the plugging phenomenon without realization of the benefits desired by the injection of solvent into the formation.

It can be seen from the foregoing that there is a substantial need for a method of preventing the formation of a highly viscous, immobile bitumen or bitumen-solvent plug in a tar sand formation. Stated in another way, there is a need for maintaining flow channels open within the formation so that the injected solvent can contact and dissolve bitumen and transport it to the production well.

SUMMARY OF THE INVENTION

We have discovered, and this constitutes our invention, that viscous petroleum may be recovered from viscous petroleum-containing formations including tar sand deposits by simultaneously injecting into the formation a solvent for petroleum which is totally in the liquid phase at formation conditions together with a noncondensible gas, i.e., a material, which will remain entirely in the gaseous phase in the reservoir. Since many materials which are totally gaseous at formation temperature and pressure are also quite soluble in the formation petroleum and/or the liquid solvent, the volume of gaseous material injected must exceed the amount which will dissolve in petroleum and/or solvent, since it is essential that a gas phase exist in the reservoir. Since the material remains gaseous at reservoir conditions, formation of an immobile bitumen-solvent plug which prevents the continued flow of fluids therethrough will be prevented. As the viscosity of the bitumen-solvent mixture increases to a point where it becomes immobile, the gas present in the formation channels through the bitumen-solvent mixture and maintains flow channels for the subsequent passage of solvent into the above-described immobile mixture. Solvent suitable for use in the process of our invention include aliphatic hydrocarbons having from about 5 to about 15 carbon atoms, aromatic hydrocarbons such as benzene, toluene or xylene, carbon tetrachloride, certain halogenated hydrocarbons, carbon disulfide, and mixtures of any two or more of the foregoing materials. Kerosene, natural gasoline, naphtha and other commonly available liquid hydrocarbon solvents may also be used. Gases suitable for use in the process of our invention include carbon dioxide, air, nitrogen, low molecular weight aliphatic hydrocarbons such as methane ethane and propane, and depending on the temperature and pressure existing within the formation, butane, and mixtures thereof.

DESCRIPTION OF THE PREFERRED EMBODIMENTS

The Process

The process of our invention comprises a fluid injection-throughput operation necessitating at least one injection well and at least one production well drilled into and in fluid communication with the tar sand deposit. An effective solvent for the particular viscous petroleum or bitumen to which the process is to be applied and which remains entirely liquid at formation temperature and pressure; and a gas, which remains entirely gaseous at the conditions of temperature and pressure existing within the reservoir, is injected simultaneously with the solvent. One preferred embodiment for simultaneous injection of noncondensible gas and solvent according to the process of our invention involves the use of injection wells which have at least two completely separate injection flow paths so the noncondensible gas may be injected via one path and the liquid solvent injected via the other path. This arrangement insures that noncondensible gas and solvent are both entering the formation simultaneously at all times, and further permits the separate control of flow rates of each material. This may be accomplished, for example, by running two parallel tubing strings into the injection well, one for gas and one for solvent, each string being in fluid communication with the formation. Alternatively, a cased well may be utilized with one of the materials being injected via a tubing string run inside the casing and the other material injected via the annular space between the tubing and the casing. One may also utilize a single injection string, injecting sequential slugs of solvent and noncondensible gas, which mix in the formation.

As the injected liquid solvent begins moving through the formation, gas will likely be dispersed therein in the form of discrete pockets or bubbles. Bitumen dissolves in the solvent as solvent moves through the formation, and the concentration of bitumen dissolved in solvent increases with distance from the point of introduction into the formation. As the concentration of bitumen dissolved in solvent increases, the viscosity of the bitumen-solvent solution increases, and so the difference between the viscosity of the gas and the viscosity of the bitumen-solvent mixture increase. As the viscosity of the bitumen-solvent solution becomes so great that the mixture or solution tends to become immobile, the condition which would otherwise tend to cause a plug of highly viscous, immobile bitumen which would defeat further injection of solvent into the formation, gas tends to form minute flow channels within the bitumen-solvent mass. The formation of these elongated flow channels is a consequence of the inherently poor displacement efficiency which results from the displacing fluid viscosity (e.g., gas, in this instance) being much less than the displaced fluid (bitumen and solvent) viscosity. Once the bitumen-solvent material ceases to move, the moving and hence displacing material is the noncondensible gas, and so it tends to function similarly to a gas drive or gas displacement process. It is well known in the art that gas displaces petroleum in a very inefficient manner and tends to channel through the petroleum because of the adverse mobility ratio existing between liquid petroleum and a gas displacing medium. This phenomenon is often referred to in the literature as viscous fingering. Accordingly, as the bitumen-solvent material viscosity becomes so great that it essentially becomes immobile, noncondensible gas fingering through the bitumen-solvent mass occurs. This fingering phenomena in this particular instance is beneficial to the recovery process, since it provides the flow channels for subsequently injected solvent to move through the mass dissolving additional bitumen therefrom. As bitumen is dissolved from the walls of the flow channels, the flow channels themselves become larger, and so eventually more and more of the bitumen can be removed from the plug which was formed in the formation earlier.

The occurrence of these events can be detected on the surface by monitoring the injection pressure and flow rates, as well as by monitoring the concentration of bitumen in the produced bitumen-solvent solution, and the production fluid flow rates. As the bitumen-solvent bank begins to become immobile, the injection pressure increases and the injection flow rate decreases. The injection pressure may be increased somewhat as the flow rate decreases, although it is important to maintain the injection pressure below the point which would cause parting or fracturing of the overburden, with fluid returns being established through the overburden, which would terminate the recovery operation. As a general rule of thumb, the injection pressure in pounds per square inch should not exceed the overburden thickness in feet.

In especially severe situations, as where the injectivity of the formation is quite low, it is desirable to initiate injection of noncondensible gas into the formation before any solvent is injected into the formation. After noncondensible gas has been pumped through the formation for a period of time, saturation of the formation by the noncondensible gas insures the formation of flow channels which will permit subsequent injection of the solvent into the formation without fear of formation of a plug.

Ordinarily, the ratio of volume flow rate of noncondensible gas to volume flow rate of solvent will range from about 0.5 to about 35 standard cubic feet of gas per gallon of solvent. The volume of noncondensible gas in excess of that dissolved in the petroleum and solvent should be from 5 to 100 and preferably from 10 to 40 pore volume percent based on the pore volume to be swept by the solvents.

In certain formations, superior results are achieved if the ratio of noncondensible gas volume flow rate to solvent volume flow rate is tapered or varied with time during the course of the recovery process. In formations containing high concentrations of viscous petroleum or bitumen, for example, it is desirable to start injection with a fairly high ratio of noncondensible gas to solvent, and gradually taper or decrease this gas-solvent ratio to a value within the above stated range as the process continues.

Although excellent recovery of bitumen results from continuous injection of solvent into the formation, the cost of solvents in a continuous solvent injection program is substantial. Accordingly, one may inject from about 0.1 to about 5.0 pore volumes (of formation volume to be swept) of solvent simultaneously with the injection of a noncondensible gas in the range of ratios described above, followed by the injection of an aqueous drive fluid such as water.

Hot water and/or steam may also be injected after solvent injection, to facilitate recovery of petroleum and to recover the solvent previously injected.

While much of the foregoing discussion of the process has been concerned with the mechanism responsible for the benefits resulting from the practice of our invention, we do not wish to represent that this is the only mechanism responsible for benefits resulting from the practice of our process, nor are the benefits described the only benefits to be realized.

The Solvent

Any material capable of dissolving the viscous petroleum or bituminous petroleum contained in the formation to which the process is to be applied, resulting in the formation of a single liquid phase solution of solvent and bitumen having a viscosity substantially less than the viscosity of virgin bitumen, may be used as the solvent in our process. It is essential that the solvent remain entirely in the liquid phase at formation conditions.

Aliphatic hydrocarbons, specifically linear or branched aliphatic hydrocarbons including alkyl hydrocarbons having from 5 to 15 carbon atoms are suitable solvents under many conditions for use in our invention. For example, pentane, hexane, heptane, octane, nonane, decane, undecane or dodecane, etc. and mixtures thereof as well as commercial blends such as kerosene, natural gasoline, or naphtha are excellent solvents in many viscous petroleum-containing formations.

Mononuclear aromatic hydrocarbons, especially benzene, toluene, xylene, or other substituted benzene materials, as well as multiple ring aromatic compounds such as naphthalene are also excellent solvents for use in our process. Economics will generally dictate that only the simpler compounds such as benzene, toluene or xylene, and mixtures thereof, will be used. Mixed aromatic solvents are frequently available from processing streams of refineries which contain a mixture of benzene, toluene, xylene, and substantial amounts of saturated hydrocarbons, and in some instances low molecular weight aliphatic materials such as $C_5$-$C_{15}$. Such materials are economical solvents and frequently the materials are very satisfactory for use in our process. Again, this can best be determined by simple tests utilizing the solvent under consideration and a sample of crude petroleum from the formation.

Carbon tetrachloride and certain halogenated hydrocarbons which are insoluble in and unreactive with water may also be utilized alone or as a component of the solvent. Such materials are frequently highly effective for dissolving asphaltic materials.

Carbon disulfide, $CS_2$, is an especially attractive solvent for use in application of our invention to tar sand deposits and other formations which contain highly asphaltic or bituminous petroleum. Carbon disulfide will frequently dissolve fractions of bituminous petroleum from tar sands which cannot be dissolved by conventional solvents. Carbon disulfide may be used alone as the sole constituent of the solvent although such use is expensive. A substantial improvement in the performance of conventional solvents results from the inclusion of a small amount of carbon disulfide in the conventional solvent. Accordingly, an expecially preferred embodiment of our invention involves the use of a mixture of carbon disulfide with a more conventional solvent such as pentane, etc. or with aromatic hydrocarbons such as benzene, toluene, or xylene, or with mixtures of both aliphatic and aromatic hydrocarbons.

The Noncondensible Gas

Any substance which remains entirely in the gaseous phase at the temperature and pressure of the subterranean petroleum formation may be utilized as the noncondensible gas component in the process of our invention. It is desirable that the gas be essentially unreactive with the materials present in the formation. For example, air is the most readily available noncondensible gas for use under almost all field conditions, but the oxygen constituent of air may react under certain conditions with petroleum or solvent in a low temperature oxidation reaction. This reaction may or may not be adverse to the process but it should be taken into consideration in any contemplated use of air in connection with this process. While air is not the preferred gas for use in the process of our invention, it can be used effectively in many applications.

Nitrogen is a preferred noncondensible gas for use in our process in combination with any of the solvents enumerated above. Nitrogen is readily availabe in many areas at an attractive cost, and it is possible to separate nitrogen from air in the field by techniques well known in the prior art. Nitrogen is essentially unreactive with and insoluble in the solvents or in formation petroleum. Accordingly, one especially preferred embodiment employs utilization of nitrogen alone or in combination with other gases as the noncondensible gas utilized with the above-described solvents.

Carbon dioxide is another excellent noncondensible gas suitable for use in the process of our invention. Carbon dioxide is readily available in the oil field as the by-product of other processes. Exhaust gases from steam generators, engines, etc., which have high carbon dioxide contents, may also be utilized as the noncondensible gas in our process. Although carbon dioxide is soluble in many hydrocarbon solvents and in formation petroleum, it is possible to inject sufficient quantities of carbon dioxide under proper conditions of temperature and pressure that an adequate amount of carbon dioxide remains undissolved in the solvent and petroleum, to form the noncondensible gas phase necessary for the improvement according to the process of our invention. Moreover, dissolution of carbon dioxide in viscous petroleum results in a viscosity reduction, which aids in the recovery thereof.

Low molecular weight hydrocarbons such as methane and ethane may also be utilized as the noncondensible gas of our process. Again, some solubility of these gases may be expected in both the solvent and formation petroleum, and dissolution in bitumen may be beneficial. It is important important to operate so as to have a portion of the injected gas in the gaseous phase, however, Accordingly, another especially preferred embodiment of our process employs low molecular weight hydrocarbons, such as methane, ethane, and depending on the pressure and temperature existing within the formation, propane and butane, in sufficient quantities so they will be gaseous in the formation.

Mixtures of any or all of the above-described gases may also be utilized. The above-described gases comprise the most commonly available and economically attractive choices, although we do not wish to be restricted to these specific materials. Any substance which exist entirely in the gaseous phase at reservoir temperature and pressure and which is essentially unreactive with the solvent and formation materials can be utilized as the noncondensible gas component of the process of our invention.

As previously stated, the ratio of noncondensible gas to solvent should be from about 0.50 to about 35 standard cubic feet of gas per gallon of solvent. In the instance of using gases having appreciable solubility in either the solvent or bitumen, the quantity of gas should be in the higher portion of this range.

Field Example

In order to better understand the process of our invention, the following pilot field example is offered as an illustrative embodiment of our invention; however, it is not meant to be limitative or restrictive thereof.

A tar sand deposit is located at a depth of 125 feet and the thickness of the deposit is 65 feet. Since the ratio of overburden thickness to tar sand deposit thickness is greater than one, the deposit is not economically suitable for strip mining. Since the overburden thickness is only 125 feet, the deposit is too shallow to tolerate the high pressures necessary for thermal recovery operations such as in situ combustion or steam flooding. Accordingly, it is determined that the most attractive method of exploiting this particular reservoir is by means of solvent or miscible flooding. Since the permeability of the formation is low and in view of the nature of the petroleum contained therein, it is determined that a simple solvent injection program would not be satisfactory or successful because of the tendency for a bitumen-solvent bank to form which becomes highly viscous and plugs the formation. Accordingly, a noncondensible gas must be utilized with the solvent.

A mixed aromatic solvent is available from a nearby refinery, the composition of which is approximately 30 percent benzene, 20 percent toluene, 5 percent xylene, and 45 percent mixed aliphatic hydrocarbons ranging from $C_6$ to $C_{10}$.

Natural gas which is approximately 95 percent methane and the remainder ethane and propane is available in the field and it is determined that this is a suitable noncondensible gas for use in combination with the above-described solvent.

The field pilot is developed utilizing an inverted five-spot pattern with four production wells located at the corners of a 200 foot square and an injection well located in the center thereof. Since the permeability is 25 percent and the sweep efficiency of the pattern utilized in this particular experiment in tar sands is 40 percent, and the vertical thickness contacted will be around 3 feet, the total swept pore volume is $200 \times 200 \times 3 \times 0.25 \times 0.40 = 12,000$ cubic feet.

Initially, the above described noncondensible gas alone is injected into the formation until gas production at the production wells is detected. This has the effect of increasing liquid solvent injectivity and presaturating the petroleum with gas. It is determined to inject a twenty pore volume percent slug of solvent (17,950 gallons) into the formation simultaneously with the injection of the above-described noncondensible gas. Initially, the gas-solvent ratio is 50 standard cubic feet of gas per gallon of liquid solvent, and this is gradually reduced to 20 SCF gas per gallon of solvent over the period required for the injection of the total 20 pore volume percent slug of liquid solvent. Injection of solvent requires 3 weeks, after which hot water (185° F) injection is initiated to displace the injected solvent slug through the formation. Gas is also injected simultaneously with the injected water in order to insure that the water is saturated with respect to natural gas and also to maintain the gas saturation within the reservoir during the water injection period. During the hot water injection phase, the gaswater ratio is maintained at about 10 standard cubic feet of gas per gallon of water. Water injection is continued until water breaks through at the producing wells and the water-oil ratio rises to about 30 after which continued production is no longer economically feasible.

While our invention has been described in terms of a number of specific illustrative embodiments, it is not so limited and many variations over these specific embodiments will be apparent to persons skilled in the related art without departing from the true spirit and scope of our invention. Furthermore, we do not wish to be limited to any particular explanation of the phenomenon or mechanism resulting from the use of a noncondensible gas in combination with a solvent. It is our wish and intention that our invention be limited and restricted only by such limitations and restrictions as appear in the appended claims.

We claim:

1. A method for recovering viscous petroleum including bitumen from subterrean, viscous petroleum-containing formations including tar sand deposits penetrated by at least one injection well and by at least one production well, said wells being in communication with the formation, comprising:
  a. injecting a solvent for the formation petroleum into the formation via the injection well, the solvent being entirely in the liquid phase at formation temperature and pressure, and
  b. simultaneously injecting a gas into the formation, which is entirely in the gaseous phase at the temperature and pressure of the formation, in an amount sufficient to ensure that a discrete gas phase exists in the petroleum formation to form a two phase solvent gas mixture which prevents formation of a solvent flow-blocking obstruction of viscous petroleum;
  c. maintaining the ratio of noncondensible gas to solvent in the range from about 0.5 to about 35 standard cubic feet gas per gallon of solvent, the ratio of gas to solvent being initially near the maximum value of the stated range and being decreased with time, said solvent and gas displacing petroleum through the formation to the production well; and
  d. recovering petroleum displaced by the solvent from the formation via the production well.

2. A method as recited in claim 1 wherein the injection well contains at least two separate flow paths, and the gas and liquid solvent are injected simultaneously via the separate injection paths.

3. A method as recited in claim 1 wherein the solvent for the petroleum contained in the subterranean formations is selected from the group consisting of monocyclic aromatic hydrocarbon solvents including benzene, toluene, and xylene, aliphatic hydrocarbon solvents having from 5 to 15 carbon atoms, carbon tetrachloride, halogenated hydrocarbons which are essentially insoluble in and unreacted with water, carbon disulfide, and mixtures thereof.

4. A method as recited in claim 3 wherein the aromatic solvent for petroleum is benzene.

5. A method as recited in claim 3 wherein the aromatic solvent for petroleum is toluene.

6. A method as recited in claim 3 wherein the aromatic solvent for petroleum is xylene.

7. A method as recited in claim 3 wherein the solvent is carbon tetrachloride.

8. A method as recited in claim 3 wherein the solvent is carbon disulfide.

9. A method as recited in claim 1 wherein the material injected into the formation which remains in the gaseous phase at the temperature and pressure in the subterranean formation, is selected from the group consisting of methane, ethane, propane, carbon dioxide, nitrogen, air, flue gases, and mixtures thereof.

10. A method as recited in claim 9 wherein the noncondensible gas is methane.

11. A method as recited in claim 9 wherein the noncondensible gas is ethane.

12. A method as recited in claim 9 wherein the noncondensible gas is nitrogen.

13. A method as recited in claim 9 wherein the noncondensible gas is carbon dioxide.

14. A method as recited in claim 9 wherein the noncondensible gas is air.

15. A method as recited in claim 13 wherein the noncondensible gas is flue gas.

16. A method as recited in claim 1 wherein from about 0.10 to about 5.0 pore volumes of solvent is injected into the formation.

17. A method as recited in claim 1 wherein essentially pure gas is injected first, after which gas and solvent are injected.

18. A method as recited in claim 1 comprising the additional step of injecting an aqueous drive fluid selected from the group consisting of water, hot water and steam into the formation after injection of the solvent of step (b) to displace the injected solvent, gas and petroleum through the formation.

19. A method as recited in claim 18 wherein noncondensible gas is injected simultaneously with the drive fluid.

20. A method for recovering petroleum including bitumen from a subterranean, viscous petroleum-containing formation including a tar sand deposit penetrated by at least one injection well and by at least one production well, said wells being in fluid communication with the formation, comprising:
  a. injecting a solvent for the formation petroleum into the formation, the solvent being entirely in the liquid phase at formation temperature and pressure, and
  b. injecting a gas into the formation, which is entirely in the gaseous phase at the temperature and pressure of the formation, wherein
  c. the ratio of noncondensible gas to solvent is from about 0.5 to about 35 standard cubic feet of gas per gallon of solvent, and
  d. the ratio of gas to solvent is initially at or near the maximum value of the stated range and is decreased with time.

21. A method as recited in claim 20 wherein the gas and solvent are injected simultaneously.

22. A method as recited in claim 21 wherein the gas and solvent are injected sequentially.

23. A method as recited in claim 21 wherein the injection well contains at least two separate flow paths, and the gas and liquid solvent are injected simultaneously via the separate injection paths.

24. A method as recited in claim 21 wherein the solvent for the petroleum contained in the subterranean formation is selected from the group consisting of monocyclic aromatic hydrocarbon solvents including benzene, toluene, and xylene, aliphatic hydrocarbon solvents having from 5 to 15 carbon atoms, carbon tetrachloride, halogenated hydrocarbons which are essentially insoluble in and unreactive with water, carbon disulfide, and mixtures thereof.

25. A method as recited in claim 24 wherein the aromatic solvent for petroleum is benzene.

26. A method as recited in claim 24 wherein the aromatic solvent for petroleum is toluene.

27. A method as recited in claim 24 wherein the aromatic solvent for petroleum is xylene.

28. A method as recited in claim 24 wherein the solvent is carbon tetrachloride.

29. A method as recited in claim 24 wherein the solvent is carbon disulfide.

30. A method as recited in claim 21 wherein the gas injected into the formation which remains entirely in the gaseous phase at the temperature and pressure of the subterranean formation, is selected from the group consisting of methane, ethane, propane, carbon dioxide, nitrogen, air, flue gas, and mixtures thereof.

31. A method as recited in claim 30 wherein the gas is methane.

32. A method as recited in claim 30 wherein the gas is ethane.

33. A method as recited in claim 30 wherein the gas is nitrogen.

34. A method as recited in claim 30 wherein the gas is carbon dioxide.

35. A method as recited in claim 30 wherein the gas is air.

36. A method as recited in claim 30 wherein the gas is flue gas.

37. A method as recited in claim 21 wherein essentially pure gas is injected first, after which gas and solvent are injected.

38. A method as recited in claim 21 comprising the additional steps of injecting an aqueous drive fluid selected from the group consisting of water, hot water and steam, into the formation after injection of the solvent.

39. A method as recited in claim 38 wherein a non-condensible gas is injected simultaneously with the drive fluid.

* * * * *